Nov. 17, 1931.  R. W. BILES ET AL  1,832,353
ELECTRIC PROTECTIVE ARRANGEMENT
Filed March 28, 1930  3 Sheets-Sheet 1

Nov. 17, 1931.  R. W. BILES ET AL  1,832,353
ELECTRIC PROTECTIVE ARRANGEMENT
Filed March 28, 1930  3 Sheets-Sheet 3

Patented Nov. 17, 1931

1,832,353

UNITED STATES PATENT OFFICE

REGINALD WILLIAM BILES, OF NEW BARNET, AND ERIC WALTER MARBURY SCOTT, OF CHURCH STRETTON, ENGLAND, ASSIGNORS TO A. REYROLLE & COMPANY LIMITED, OF HEBBURN-ON-TYNE, ENGLAND

ELECTRIC PROTECTIVE ARRANGEMENT

Application filed March 28, 1930, Serial No. 439,842, and in Great Britain April 19, 1929.

This invention relates to electric protective arrangements for alternating current circuits wherein pilot wires are employed, and, although applicable to the protection of electric machines and apparatus, is more particularly suitable for the protection of feeders and like transmission and distribution systems.

The protective arrangements employed for alternating currents are usually of the Merz-Price type in which the current entering the protected circuit at one end is balanced against that leaving the circuit at the other end. Such arrangements, besides requiring accurate calibration of current transformers and other apparatus, usually entail the use of heavily insulated and expensive pilot wires.

The present invention has for its object the provision of a protective arrangement which eliminates special balancing of the current transformers and permits comparatively high resistance pilot wires, e. g. a telephone pair, to be used.

According to this invention means are provided at each end of the protected circuit for injecting into a pilot wire system a current of limited magnitude having a direction corresponding to the direction of current flow in the protected circuit at the adjacent end, and one or more lock-out relays associated with the pilot wire system act, when the current flowing in the pilot system is greater than a predetermined value exceeding the limited value of current injected from either end alone, to prevent the cutting out of the protected circuit by tripping relay devices which are arranged at the ends of the protected circuit and are operative in accordance with the current flow therein.

Conveniently the current of limited value is injected into the pilot system by means of a saturable device, such as a transformer or a choke coil, disposed at each end of the protected circuit and energized from the current transformers at the adjacent end.

When this arrangement is applied to the protection of a multiphase circuit the current transformers at each end are conveniently connected to a saturable summation transformer or auto-transformer or to a summation transformer or auto-transformer which is in turn connected in cascade to a saturable transformer or choke coil.

The tripping relay device may consist of ordinary overload and earth leakage relays which, in the case of a multiphase circuit, are connected between the current transformers and the summation transformer, or of a low voltage device operative when a collapse of voltage occurs in the protected circuit, or of any other suitable arrangement such, for example, as a tripping relay device connected in series between the summation transformer or auto-transformer and the saturable device. If desired the core of the the saturable device, or of a summation transformer or auto-transformer to which the device is connected, may form part of the magnetic circuit of the tripping relay device.

In one arrangement a combined transformer or auto-transformer and relay, connected between the current transformers in the protected circuit and the saturable device, has a U-shaped core and a contact, making armature which is actuated when a predetermined magnetic flux circulates in the core. In an alternative arrangement a combined saturable transformer and relay comprises a main U-shaped core on which the primary winding is wound, a contact-making armature which is actuated when a predetermined magnetic flux circulates in the core, and a shunt magnetic core between the two limbs of the main core carrying the secondary winding, the cross-sectional area of the shunt magnetic core being small relative to that of the main core so that the shunt core becomes saturated at a predetermined value of primary current.

When employed for multiphase circuits the combined transformer and relay or the combined saturable transformer and relay is preferably provided with a summation primary winding having tapping points connected to the current transformers in the protected circuit, the parts of this winding on the two limbs of the core being so arranged that they are energized symmetrically from the current transformers in the several phases.

Several alternative forms of protective arrangement according to this invention, as applied to electric feeders and other circuits, will now be described by way of example with reference to the accompanying drawings, in which.

Figure 1:
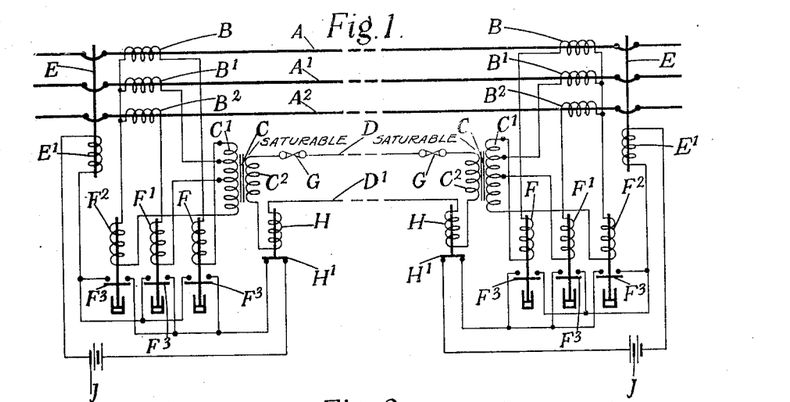
Figure 1 shows one arrangement used for the protection of a three-phase feeder.

In the arrangement shown in Figure 1, a three-phase feeder A, $A^1$, $A^2$ has its ends passed through the annular cores of three single-phase equal ratio current transformers having secondary windings B, $B^1$, $B^2$. The three secondary windings B, $B^1$, $B^2$ are connected in star and the star-point is connected to one end of the primary winding $C^1$ of a summation transformer C. The other sides of the secondary windings B, $B^1$, $B^2$ are connected to separate tapping points on the primary winding $C^1$ so that with a balanced three-phase current in the protected circuit, the E. M. F.'s induced in the secondary winding $C^2$ of the summation transformer C by the three phases differ from one another by a small but definite amount. The output leads of the secondary winding $C^2$ of the summation transformer are connected to two pilot wires D, $D^1$ which extend between two ends of the protected circuit, the secondary windings of the summation transformers at the two ends being connected so that the currents which they supply to or inject into the pilot circuit are normally additive.

Each summation transformer is so constructed that at a predetermined value of primary ampere turns its magnetic core is saturated. Hence the output current of its secondary winding $C^2$ is limited to a maximum value which is independent of increases in the primary current above the value at which saturation takes place.

It will be appreciated that the E. M. F. induced in the secondary winding $C^2$ of the summation transformer depends, in the case of an earth fault, on the total turns in the primary winding connected between the star-point and the faulty phase and, in the case of an interphase fault, on the turns of the primary winding between the tapping points to which the two faulty phases are connected. The transformer therefore becomes saturated at a relatively low value of earth fault current and provides a discriminating arrangement in which the sensitivity to interphase faults is independent of the sensitivity to earth faults. Conveniently the turns and tapping points on the primary winding are arranged so that the core becomes saturated, in the case of interphase faults, when the current in the protected circuit is 200–300% of the normal full load value, and in the case of earth faults when the earth leakage current is 50% of the normal full load current.

The trip coil $E^1$ of the circuit-breaker E at each end is controlled by overload and earth-leakage relays, there being two overload relays F and $F^1$ respectively connected in series with the current transformer secondaries B and $B^2$ and an earth-leakage relay $F^2$ in the connection between the star-point of the current transformers B, $B^1$, $B^2$ and the primary winding $C^1$. The normally open contacts $F^3$ of the overload and earth-leakage relays are connected in parallel with one another to control the circuit of the adjacent trip coil $E^1$.

Two lock-out relays H, one at each end, are connected in series in the pilot wire $D^1$, each relay being provided with normally closed contacts $H^1$ connected in series in the circuit of the adjacent trip coil $E^1$. A battery J is also connected in series in the circuit of the trip coil $E^1$ at each end so that, provided the adjacent lock-out relay H has not operated, the operation of either of the overload relays F, $F^1$ or of the earth-leakage relay $F^2$ causes the trip coil $E^1$ to be energized and the circuit-breaker E to be cut out. If, however, the lock-out relay H operates, its contacts $H^1$ are opened and thus, as a point is opened in the circuit of the trip coil $E^1$, the operation of the overload and earth-leakage relays is rendered ineffective.

Owing to the saturable properties of the summation transformers C, the current circulating in the pilot circuit is limited to the sum of the secondary saturation currents of the two summation transformers. The lock-out relays H are calibrated so that they will not be energized until the current flowing in the pilot circuit is appreciably greater than the saturation current of one of the summation transformers, for example 1.5 times such saturation current.

Considering now the operation of the arrangement during different fault conditions in the protected circuit. A straight-through fault causes both the summation transformers C to become saturated and thus to circulate a current through the lock-out relays H which is equal to the sum of the saturation currents of the two summation transformers. The lock-out relays H are therefore operated and prevent the circuit-breakers from being tripped and the protected circuit cut out.

When a fault develops in the protected circuit and is fed from one end of the line, only one summation transformer C circulates current in the pilot circuit. This current is not sufficient to operate the lock-out relays H, so that the protected circuit is cut out when one of the relays F, $F^1$, $F^2$ at the feeding end operates.

When a fault in the protected circuit is fed equally from each end of the line the summation transformers C are in opposition so that substantially no current, other than capacity current, flows in the lock-out relays H, which therefore remain inoperative and allow the protected circuit to be cut out at both ends.

In order to ensure stability during straight-through faults, the lock-out relays H are arranged to operate at a value of primary current which is less than the primary current setting of the relays F, $F^1$, $F^2$. The relays H also have a shorter operating time than the overload and earth-leakage relays, this being indicated in Figure 1 by means of the dashpots on the relays F, $F^1$, $F^2$. If desired time limit overload back-up or stand-by protection may be provided by means of fuses G connected in series in the pilot wire circuit.

Figure 2:
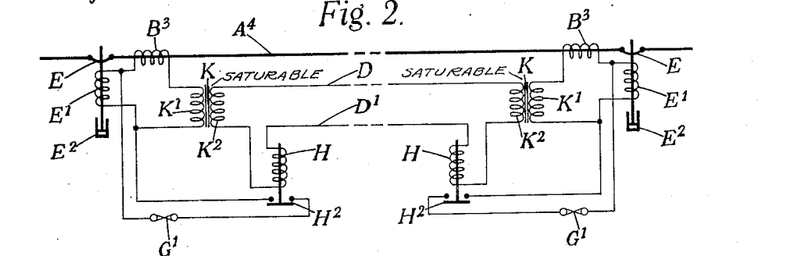
Figure 2 shows a modification of the arrangement shown in Figure 1 used for the protection of a single-phase feeder.

In the single-phase arrangement shown in Figure 2, the secondary winding $B^3$ of the current transformer at each end of the protected feeder $A^4$ is connected to the primary winding $K^1$ of a saturable transformer K in series with the trip coil $E^1$ of the adjacent circuit-breaker E. The secondary windings $K^2$ of the saturable transformers K are connected to the pilot wires D, $D^1$ as in the arrangement shown in Figure 1. The lock-out relays H are provided with normally open contacts $H^2$ which are connected in parallel with the adjacent trip coil $E^1$ so that when the lock-out relay operates the trip coil is short-circuited.

On the occurrence of a fault in the protected circuit the fault current flowing in the secondary winding $B^3$ of the current transformer at the feeding end (or at both ends if the fault is fed from both ends) is sufficient to cause the adjacent trip coil $E^1$ to operate the circuit-breaker E to cut out the protected circuit. As only one of the transformers K is saturated (or in the case of a fault fed from both ends the two transformers K supply their saturation currents to the pilot circuit in opposition) the lock-out relays H remain inoperative. In the case of a straight-through fault the saturation currents supplied to the pilot circuit by the transformers K are additive and the lock-out relays H operate to short-circuit the trip coils $E^1$ and thus to prevent the protected circuit from being cut out. Stability is ensured by providing the circuit-breaker operating mechanism with a time lag device, indicated by the dash pot $E^2$, so that, during a straight-through fault, the lock-out relays H will operate before the circuit-breakers are opened by the energization of their trip coils $E^1$. Time limit overload back-up or stand-by protection may be provided by the fuses $G^1$ connected in series in the circuit of the short-circuiting contacts $H^2$.

The employment of lock-out relays with normally open contacts permits direct tripping to be used although, if desired, a separate tripping relay can be employed which is short-circuited when the lock-out relay operates. Alternatively, as in the arrangement shown in Figure 1, normally closed contacts of the lock-out relay may be arranged in series in the circuit of the tripping relay. Similarly lock-out relays having normally open contacts can be used in the arrangement shown in Figure 1, the contacts being connected so that the adjacent overload and earth-leakage relays are short-circuited when the lock-out relay operates.

Figure 3:
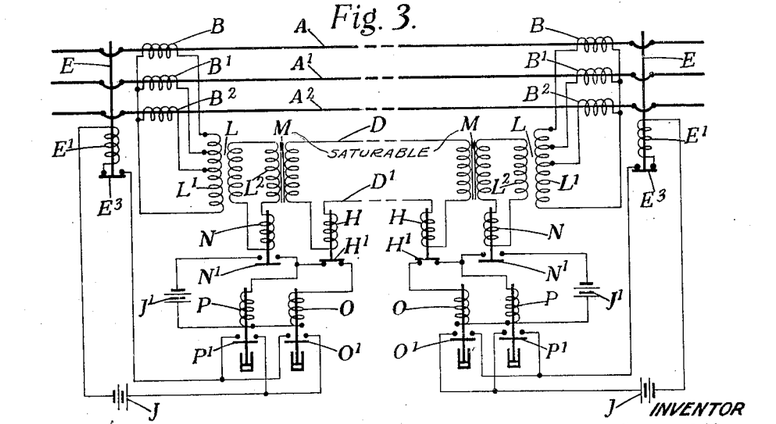
Figure 3 shows another arrangement used for the protection of a three-phase feeder.

In the arrangement shown in Figure 3 the secondary windings B, $B^1$, $B^2$ of the current transformers at each end of the protected feeder are connected to the primary winding $L^1$ of a summation transformer L in the same way as the corresponding windings are connected to the primary winding of the saturable summation transformer of the arrangement shown in Figure 1. The secondary winding $L^2$ of the summation transformer is connected to the primary winding of a saturable transformer M the secondary winding of which is in turn connected to the pilot wires D, $D^1$. A tripping relay N having normally open contacts $N^1$ is connected in series between the secondary winding $L^2$ of the summation transformer L and the primary winding of the saturable transformer M so that it operates on the occurrence of a fault in the main circuit. The lock-out relays H have normally closed contacts $H^1$ and, as in the arrangement shown in Figure 1, are connected in series in the pilot wire $D^1$.

In order to ensure stability a slow-acting auxiliary relay O is interposed between the tripping relay N and the trip coil $E^1$ of the circuit-breaker E. The auxiliary relay O is energized from the battery $J^1$ through the contacts $N^1$ of the relay N and the contacts $H^1$ of the relay H, so that, provided the lock-out relay H has not operated, the relay O is energized by the operation of the tripping relay N. The relay O operates to complete, at its contacts $O^1$, a circuit energized from the battery J for the trip coil $E^1$ of the adjacent circuit-breaker E. The time interval between the energization and the operation of the relay O is such that during a straight-through fault the adjacent lock-out relay H operates to open a point in the circuit of the relay O before this relay actually operates.

Connected in series in the circuit of the trip coil $E^1$ is an auxiliary switch $E^3$ controlled by the circuit-breaker operating mechanism so that it is closed when the circuit-breaker is closed and is operated to open a point in the circuit of the trip coil $E^1$ when the circuit-breaker trips out.

If desired time-limit, overload back-up or stand-by protection can be provided by means of a slow-acting relay P energized from the battery $J^1$ over a circuit including in series the contacts $N^1$ of the tripping relay N. The contacts $P^1$ of the relay P are connected in parallel with the contacts $O^1$ of the relay O so that the trip coil $E^1$ is energized when the relay P operates. The time-lag of the relay P is of course very much greater than that of the relay O.

The operation of this arrangement is similar to that of the arrangement shown in Figure 1, the energization of the tripping relay N in accordance with the current supplied by the secondary winding $L^2$ of the summation transformer L providing the discrimination between interphase faults and earth faults which is obtained in the arrangement shown in Figure 1 by means of separate overload and earth-leakage relays.

Figure 4:
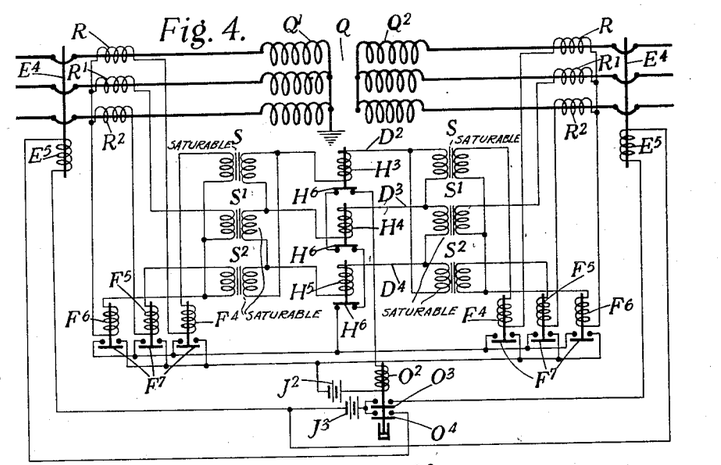
Figure 4 shows an arrangement used for the protection of a three-phase power transformer.

Figure 4 shows the combination of three single-phase protective arrangements used for the protection of a three-phase star-star connected power transformer Q having primary windings $Q^1$ and secondary windings $Q^2$. The three phase conductors to each side of the transformer Q are passed through the annular cores of three single-phase equal ratio current transformers having secondary windings R, $R^1$, and $R^2$ which are connected in star. The secondary windings R, $R^1$, $R^2$ are respectively connected to the star-connected primary windings of three saturable transformers S, $S^1$, $S^2$, and the star point of the current transformer windings R, $R^1$, $R^2$ is connected to the star-point of the primary windings of the transformers S, $S^1$, $S^2$. Overload relays $F^4$ and $F^5$ are respectively connected in series with the windings R and $R^2$ and an earth-leakage relay $F^6$ is connected in series in the connection between the star-points. The overload and earth-leakage relays $F^4$, $F^5$, $F^6$ are each provided with normally open contacts $F^7$.

The secondary windings of the saturable transformers S, $S^1$, $S^2$ at each end are connected in delta, the two groups being connected together by pilot wires $D^2$, $D^3$, $D^4$, in which lock-out relays $H^3$, $H^4$, $H^5$, having normally closed contacts $H^6$, are respectively connected in series.

A slow-acting auxiliary relay $O^2$ controls, at its normally open contacts $O^3$ and $O^4$, the energization of the trip coils $E^5$ of the circuit-breakers $E^4$ on both sides of the transformer Q. The relay $O^2$ is energized from the battery $J^2$ over a circuit which includes in series the normally closed contacts $H^6$ of the lock-out relays $H^3$, $H^4$, $H^5$ and a group of parallel-connected contacts comprising the normally open contacts $F^7$ of the overload and earth-leakage relays $F^4$, $F^5$, $F^6$ at the two ends. Thus, provided the lock-out relays have not operated, the operation of any one of the relays $F^4$, $F^5$, $F^6$ at either end completes the circuit of the auxiliary relay $O^2$ which, after a short time interval, closes its contacts $O^3$ and $O^4$ to connect the battery $J^3$ to the trip coils $E^5$ which are energized to trip out the circuit-breakers $E^5$ and cut out the transformer Q. As the contacts $H^6$ of the lock-out relays $H^3$, $H^4$, $H^5$ are in series in the circuit of the relay $O^2$, operation of any one of these relays opens a point in the circuit of the relay $O^2$ and thus renders the operation of the overload and earth-leakage relays ineffective. The operation of this arrangement is in other respects similar to that of the arrangements previously described.

Figure 5:
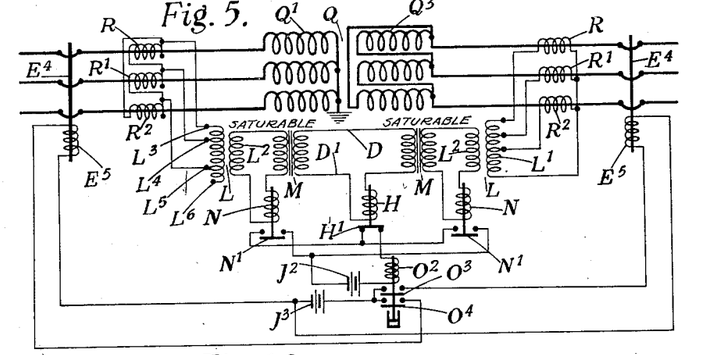
Figure 5 shows an arrangement similar to that shown in Figure 3 but applied to the protection of a three-phase power transformer.

Figure 5 shows the application of a protective arrangement similar to that shown in Figure 3 to the protection of a star-delta connected power transformer Q having a star-connected winding $Q^1$ and a delta-connected winding $Q^3$. As in the arrangement shown in Figure 4 the three-phase conductors to each side of the protected transformer Q are passed through the annular cores of single-phase equal ratio current transformers having secondary windings R, $R^1$, $R^2$. The secondary windings R, $R^1$, $R^2$ of the current transformers on the star-connected side of the protected transformer Q (that is in the conductors to the winding $Q^1$) are connected in delta and to tapping points $L^3$, $L^4$, $L^5$ on the primary winding $L^1$ of the summation transformer L at the adjacent end. Discrimination between earth faults and interphase faults is obtained by arranging that the number of turns between the tapping points $L^3$ and $L^4$ is different from the number of turns between the tapping points $L^4$ and $L^5$, the tapping points preferably being arranged so that the turns $L^3$ to $L^4$ : $L^4$ to $L^5$ : $L^5$ to $L^6$ :: 1 : 2 : 1. The secondary windings R, $R^1$, $R^2$ of the current transformers on the delta-connected side of the protected transformer are connected in star and the star-point is connected to one side of the primary winding $L^1$ of the other summation transformer L. The free ends of the windings R, $R^1$, $R^2$ are connected to tapping points on the winding $L^1$ as in the arrangement shown in Figure 3. The connection of the secondary windings of the current transformers on the star and delta sides of the protected transformer respectively in delta and star compensates for the phase displacement caused by the star-delta connection of the protected transformer.

As in the arrangement shown in Figure 3 the secondary winding $L^2$ of the summation transformer L at each end is connected, in series with a tripping relay N, to the primary winding of a saturable transformer M, the secondary windings of the two saturable transformers being connected together by the pilot wires D, $D^1$. As the pilot wires D, $D^1$ are very short it is only necessary to have one lock-out relay H, the normally closed contacts $H^1$ of which, together with the normally open contacts $N^1$ of the tripping relay N at each end, control the energization of a slow-acting auxiliary relay $O^2$. The relay $O^2$, as in the arrangement shown in Figure 4, controls the circuit of the trip coils $E^5$ of the circuit-breakers $E^4$ on each side of the protected transformer.

The operation of this arrangement is similar to that of the arrangement shown in Figure 3 and need not be further described. If desired an additional slow-acting relay (not shown) similar to the relay P of the arrangement shown in Figure 3 may be added so as to provide time limit overload back-up protection.

In the arrangement shown in Figure 6 for the protection of a three-phase feeder A, $A^1$, $A^2$ the secondary windings B, $B^1$, $B^2$ of the current transformers at each end of the protected circuit are connected in star and the star-point is connected to one end of the winding $T^1$ of a combined auto-transformer and tripping relay T (shown in detail in Figure 8) which has a U-shaped core carrying the winding $T^1$ and an armature $T^2$ pivoted below the ends of the two limbs $T^3$ and $T^4$ of the core, so that it is lifted to close its contacts $T^5$ when the magnetic flux in the core exceeds a predetermined value.

Figure 8:
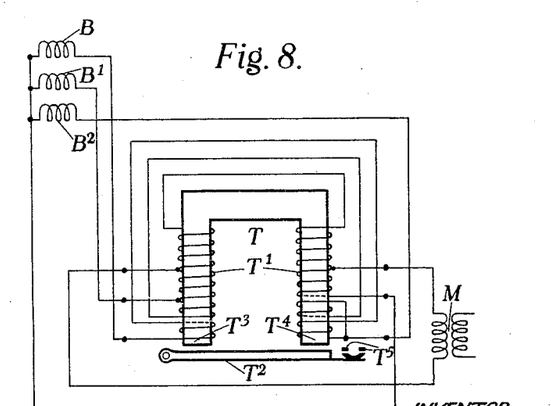
Figure 8 is a diagrammatic view of a combined summation transformer and relay.

The free ends of the secondary windings of the three current transformers B, $B^1$, $B^2$ are connected to separate tapping points on the auto-transformer winding $T^1$ so as to provide discrimination between earth faults and interphase faults. The winding $T^1$ is distributed on the two limbs $T^3$ and $T^4$ of the core, the tapping points being so arranged and the parts of the winding on the two limbs being so cross-connected that the windings on each limb are similarly energized from the three phases of the protected circuit. If desired, instead of an auto-transformer winding on the core, a summation primary winding and a separate secondary winding may be employed but a single auto-transformer winding is preferable owing to the limited winding space available.

The output terminals of the auto-transformer winding $T^1$ are connected to the primary winding of a saturable transformer M. The secondary winding of the saturable transformer M is connected to the two pilot wires D, $D^1$ which extend between the two ends of the protected circuit, the secondary windings of the saturable transformers at the two ends being connected, as in the arrangements previously described, so that the currents which they supply to or inject into the pilot circuit are normally additive. A lock-out relay H having normally closed contacts $H^1$ is connected in series with the pilot wire circuit at each end.

A slow-acting auxiliary relay O controls the trip coil $E^1$ of the circuit-breaker E at each end, the relay O being itself controlled by the adjacent combined auto-transformer and relay T and by the adjacent lock-out relay H. The normally open contacts $T^5$ controlled by the armature $T^2$ of the relay T and the normally closed contacts $H^1$ of the lock-out relay H are connected in series in the circuit of the relay O (which is energized from the battery $J^1$) so that, providing the lock-out relay H has not operated, operation of the armature $T^2$ completes the circuit of the relay O which operates, after a short time interval, to energize the trip coil $E^1$. If however the lock-out relay H operates, a point in the circuit of the relay O is opened and the operation of the relay T becomes ineffective. An auxiliary switch $E^3$ operated by the circuit-breaker mechanism, may be provided, if desired, to open the circuit of the trip coil $E^1$ as soon as the circuit-breaker is tripped out. Time limit, overload back-up or stand-by protection can be provided, if desired, by means of the slow-acting relays P arranged so that their contacts $P^1$ are in parallel with the contacts $O^1$ of the relays O as in the arrangement shown in Figure 3.

This arrangement operates on the occurrence of faults in the manner generally similar to the arrangement shown in Figure 3. The combined summation auto-transformer and relay T which has as its load the saturable transformer M, has however several practical advantages as compared with a summation transformer or auto-transformer connected in cascade to the saturable transformer and having an ordinary tripping relay in series in the cascade connection. Thus the flux in the U-shaped core increases rapidly with increase in primary current in the winding $T^1$ (current flow in the protected circuit) until the saturable transformer M is saturated; thereafter the increase is gradual until the flux is sufficient to attract the armature $T^2$. As soon as the armature $T^2$ lifts the flux increases abruptly to a value dependent upon the alteration in reluctance due to the movement of the armature, further increase in primary current causing, owing to the saturated load M, only a very gradual increase in flux. The sudden increase in flux when the armature $T^2$ lifts causes an increase in the primary current of the saturable transformer M which, though it may be comparatively small, ensures that this transformer is fully saturated and is therefore sufficiently energized, when the armature $T^2$ lifts in the case of a straight-through fault, to provide, in conjunction with the saturable transformer M at the other end, the current necessary to operate the lock-out relays H.

The re-setting value of the relay is also appreciably increased owing to the saturable load on the combined auto-transformer-relay T. Thus it has been found, for example, that while a suitable separate relay (e. g. relay N of the arrangement shown in Figure 3) has a re-setting value of about 62%, a corresponding combined summation transformer and relay with a saturable load has a re-setting value of about 82%. A high re-setting value is particularly desirable in this arrangement as the relay is partially energized when normal currents are flowing in the protected circuit and it is essential that the relay should reset after being operated by straight-through fault currents at a value well above such normal currents and as near as possible to the value which caused its operation.

Figures 6, 9:
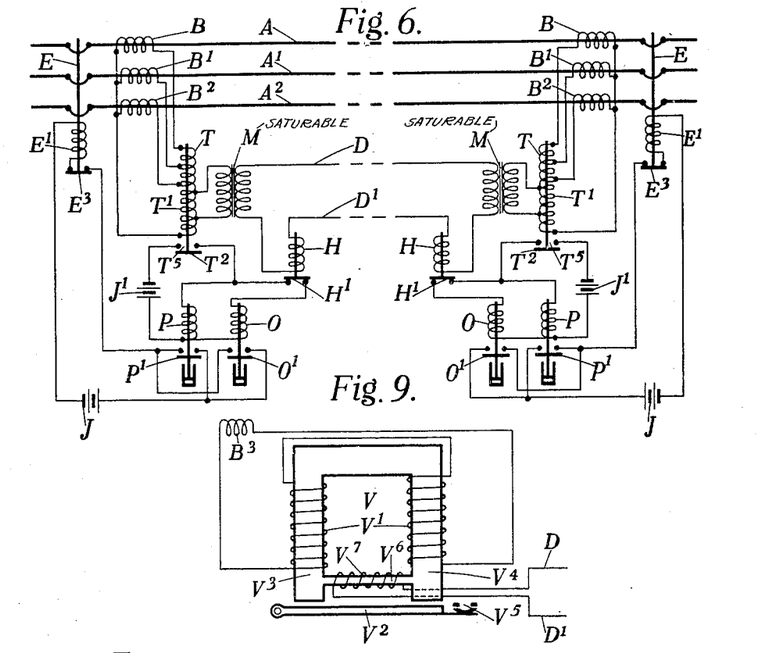
Figure 6 shows still another arrangement used for the protection of a three-phase feeder.
Figure 9 is a diagrammatic view of a combined saturable transformer and relay.
Figure 7:
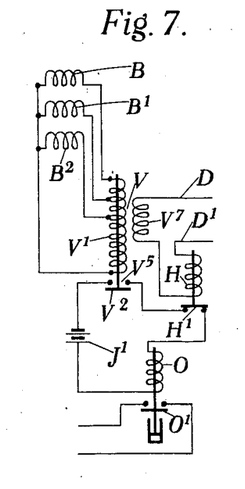
Figure 7 shows a modification of the arrangement shown in Figure 6.

In the modified arrangement shown in Figure 7 the combined summation auto-transformer and relay T connected to a saturable transformer M of the arrangement shown in Figure 6 is replaced by a combined saturable summation transformer and relay V (a single-phase form of which is shown in detail in Figure 9). In this arrangement the main U-shaped core $V^1$ and relay armature $V^2$ are similar to the combined auto-transformer and relay above described but a shunt magnetic core $V^6$ is arranged to connect the two limbs $V^3$ and $V^4$ of the U-shaped main core near their ends. The cross-section of this shunt core $V^6$ is small relative to that of the main core so that it becomes saturated when the flux in the main core due to the current flowing in the primary or summation winding $V^1$ reaches a predetermined value. The secondary winding $V^7$ of this transformer is wound on this shunt core $V^6$ and is connected to the pilot wires D, $D^1$ in the same way as the secondary winding of the saturable transformer M in the arrangement shown in Figure 6.

The cores and armature are preferably so arranged and dimensioned that the magnetic reluctance of the shunt circuit $V^6$ is of the same order as that of the magnetic circuit formed by the armature $V^2$ and air gaps when the armature is lifted, the reluctance of the main core being comparatively low so that the magnetic flux in the shunt circuit $V^6$, and therefore the current injected into the pilot wire system, are not appreciably reduced when the armature is lifted.

This modified arrangement operates on the occurrence of a fault in a manner similar to the arrangement shown in Figure 6 employing the combined auto-transformer and relay connected to a separate saturable device.

Figure 10:
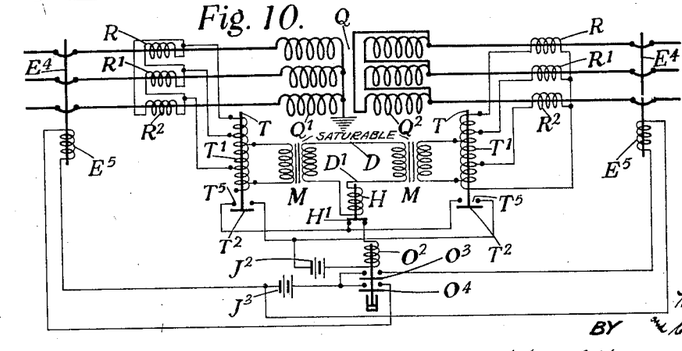
Figure 10 shows an arrangement similar to that shown in Figure 6 used for the protection of a three-phase power transformer.

In the arrangement shown in Figure 10 for the protection of a star-delta connected power transformer, the secondary windings R, $R^1$, $R^2$ of the current transformers on each side of the power transformer are connected directly to the winding $T^1$ of the combined auto-transformer and relay T and the pilot wires are connected to the secondary winding of the saturable transformer M, the windings R, $R^1$, $R^2$ on the star-connected side of the transformer Q being connected in delta and the windings R, $R^1$, $R^2$ on the delta connected side in star as in the arrangement shown in Figure 5. The armature $T^2$ of the combined auto-transformer and relay T controls normally open contacts T5 in the circuit of a slow-acting relay $O^2$ having normally open contacts $O^3$, $O^4$ controlling the circuits of the trip coils $E^5$ of the circuit-breakers $E^4$ on each side of the protected transformer. As in the arrangement shown in Figure 5 a single lock-out relay H has its normally closed contacts $H^1$ in series in the circuit of the relay $O^2$ so that when the armature $T^2$ lifts, the relay $O^2$ is energized and provided that the lock-out relay has not operated, operates after a short time interval, which ensures stability during straight-through faults, to effect the isolation of the protected transformer. If desired a combined saturable summation transformer and relay can be employed instead of a combined summation transformer and relay connected to a saturable transformer.

The lock-out relay H is calibrated so that it will not operate until the current flowing in the pilot circuit D, $D^1$ is appreciably greater than the saturation current of one of the saturable transformers M. Thus when there is a fault in the protected transformer Q the tripping relay T on the input side of the transformer is operated, only one saturable transformer M is saturated, and, as the lock-out relay H remains inoperative, the transformer Q is isolated. In the case of a straight-through fault the two saturable transformers M supply their saturation currents to the pilot circuit and the lockout relay H is operated to prevent isolation of the power transformer.

It will be appreciated that many of the features described with reference to a particular one of the arrangements are equally applicable to other arrangements. Thus for example the lock-out relays in any of the arrangements may be provided with normally open contacts, as in the arrangement shown in Figure 2, arranged when the relay operates to short-circuit the tripping relay. Furthermore overload time limit back-up or stand-by protection by means of fuses, as shown in Figures 1 and 2 or by means of slow-acting relays as shown in Figure 3 may be provided as desired in any of the arrangements described. It is also to be understood that, with the exception of arrangements employing a combined saturable transformer and relay as shown in Figures 7 and 8, a saturable choke coil or auto-transformer can be employed if desired instead of a saturable transformer.

The lock-out relays used in the various arrangements which have been described are preferably adjustable so that they can be set to operate at different pilot wire currents to compensate for different lengths of pilot wire between the two ends of a protected circuit. If desired, however, the reactance of the relay coil may be made large compared with the resistance of the longest pilot circuit which is likely to be used, so that the pilot wire currents will be substantially the same for all lengths of pilot circuit and the relay need not be adjusted.

It will also be appreciated that the above description is by way of example only, that many modifications may be made in the protective arrangements themselves, and that the arrangements according to the invention can be used for the protection of electric apparatus and circuits other than those specifically described.

What we claim as our invention and desire to secure by Letters Patent is:—

1. In an electric protective arrangement for an alternating current circuit the combination of a pilot circuit extending between the ends of the protected circuit, a circuit-breaker at each end of the protected circuit, a tripping relay device for each circuit-breaker operative in accordance with the current flow conditions at the adjacent end of the protected circuit, current transformers at each end of the protected circuit, a saturable device at each end energized from the adjacent current transformers and arranged to inject into the pilot wire circuit a current of limited magnitude having a direction corresponding to the direction of current flow in the protected circuit at the adjacent end, and at least one lock-out relay associated with the pilot wire circuit and acting to prevent the tripping relay devices from cutting out the protected circuit when the current flowing in the pilot wire circuit is greater than a predetermined value exceeding the limited value of current injected from either end alone.

2. An electric protective system for an alternating current circuit including in combination a circuit-breaker at each end of the protected section, a trip circuit for each circuit-breaker, a tripping relay device at each end controlling the trip circuit of the adjacent circuit-breaker and operative in accordance with the current flow conditions at the adjacent end of the protected circuit, current transformers at each end of the protected circuit, a saturable transformer at each end of the protected circuit having its primary winding energized from the adjacent current transformers, a pilot wire circuit so connecting the secondary windings of the saturable transformers at each end of the protected circuit that the currents supplied to the pilot wire circuit from the two saturable transformers are additive when the direction of current flow in the protected circuit is the same at both ends, and at least one lock-out relay connected in series in the pilot wire circuit and acting to prevent the operation of the tripping relay devices from cutting out the protected circuit when the current flowing in the pilot wire circuit is greater than a predetermined value exceeding the saturation current supplied to that circuit from the secondary winding of one of the saturable transformers alone.

3. In an electric protective arrangement for an alternating current circuit the combination of a pilot circuit extending between the ends of the protected circuit, a circuit-breaker at each end of the protected circuit, a tripping relay device for each circuit-breaker operative in accordance with the current flow conditions at the adjacent end of the protected circuit, current transformers at each end of the protected circuit, a saturable device at each end energized from the adjacent current transformers and directly connected to the pilot wire circuit so as to supply to that circuit a current of limited magnitude having a direction corresponding to the direction of current flow in the protected circuit at the adjacent end, and at least one lock-out relay connected in series in the pilot wire circuit and acting to prevent the tripping relay devices from cutting out the protected circuit when the current flowing into the pilot wire circuit is greater than a predetermined value exceeding the saturation current supplied to the circuit by one of the saturable devices alone.

4. In an electric protective arrangement for an alternating current circuit the combination of a pilot circuit extending between the ends of the protected circuit, a circuit-breaker at each end of the protected circuit, a tripping relay device for each circuit-breaker operative in accordance with the current flow conditions at the adjacent end of the protected circuit, current transformers at each end of the protected circuit, a saturable device at each end energized from the adjacent current transformers and directly connected to the pilot wire circuit so as to supply to that circuit a current of limited magnitude having a direction corresponding to the direction of current flow in the protected circuit at the adjacent end, at least one lock-out relay connected in series in the pilot wire circuit and acting to prevent the tripping relay devices from cutting out the protected circuit when the current flowing into the pilot wire circuit is greater than a predetermined value exceeding the saturation current supplied to the circuit by one of the saturable devices alone, and means for rendering the tripping relay device at each end effective to cut out the protected circuit independently of the lock-out relay if the current flowing in the protected circuit at the adjacent end exceeds a predetermined value for a predetermined time.

5. In an electric protective arrangement for a multiphase alternating current circuit the combination of a pilot wire circuit extending between the ends of the protected circuit, a circuit-breaker at each end, current transformers in the phases of the protected circuit at each end thereof, a summation transformer device at each end energized from the current transformers at the adjacent end, means for tripping each circuit-breaker when the current flowing in the adjacent summation transformer device exceeds a predetermined value, a saturable transformer at each end having its primary winding connected to the adjacent summation transformer device and its secondary winding connected to the pilot wire circuit, and at least one lock-out relay connected in series in the pilot wire circuit and acting to prevent the tripping means from cutting out the protected circuit when the current flowing in the pilot wire circuit is greater than a predetermined value exceeding the saturation current supplied to the circuit by one of the saturable transformers alone.

6. In an electric protective arrangement for a multiphase alternating current circuit the combination of a pilot wire circuit extending between the ends of the protected circuit, a circuit-breaker at each end, current transformers in the phases of the protected circuit at each end thereof, a combined summation transformer and tripping relay device at each end energized from the adjacent current transformers and arranged to operate to trip the adjacent circuit-breaker when the current flowing in the summation transformer device exceeds a predetermined value, a saturable transformer at each end having its primary winding connected to the adjacent summation transformer device and its secondary winding connected to the pilot wire circuit, and at least one lock-out relay connected in series in the pilot wire circuit and acting to render the operation of the combined summation transformer and tripping relay device ineffective when the current flowing in the pilot wire circuit is greater than a predetermined value exceeding the saturation current supplied to the circuit by one of the saturable transformers alone.

7. In an electric protective arrangement for a multiphase alternating current circuit the combination of a pilot wire circuit extending between the ends of the protected circuit, a circuit-breaker at each end, a trip coil for each circuit-breaker, current transformers in the phases of the protected circuit at each end thereof, a combined summation transformer and tripping relay device at each end comprising a magnetic core, a winding on the core, tapping points on the winding connected to the adjacent current transformers, output terminals on the winding, an armature actuated when the flux in the core exceeds a predetermined value and normally open contacts closed when the armature is actuated to effect the energization of the trip coil of the adjacent circuit-breaker, a saturable transformer at each end having its primary winding connected to the output terminals of the combined summation transformer and relay device and its secondary winding connected to the pilot wire circuit, and at least one lock-out relay connected in series in the pilot wire circuit and acting to render the operation of the armatures of the tripping relay devices ineffective when the current flowing in the pilot wire circuit is greater than a predetermined value exceeding the saturation current supplied to the circuit by one of the saturable transformers alone.

8. In an electric protective arrangement for a multiphase alternating current circuit the combination of a pilot wire circuit extending between the ends of the protected circuit, a circuit-breaker at each end, a trip coil for each circuit-breaker, current transformers in the phases of the protected circuit at each end thereof, a combined summation transformer and tripping relay device at each end comprising a U-shaped magnetic core, a winding on the two limbs of the core, tapping points on the winding connected to the adjacent current transformers, the parts of the winding on the two limbs being so arranged that they are energized symmetrically from the current transformers in the several phases, output terminals on the winding, an armature actuated when the flux in the core exceeds a predetermined value and normally open contacts closed when the armature is actuated to effect the energization of the trip coil of the adjacent circuit-breaker, a saturable transformer at each end having its primary winding connected to the output terminals of the combined summation transformer and relay device and its secondary winding connected to the pilot wire circuit, and at least one lock-out relay connected in series in the pilot wire circuit and acting to render the operation of the armatures of the tripping relay devices ineffective when the current flowing in the pilot wire circuit is greater than a predetermined value exceeding the saturation current supplied to the circuit by one of the saturable transformers alone.

9. In an electric protective arrangement for a multiphase alternating current circuit the combination of a pilot wire circuit extending between the ends of the protected circuit, a circuit-breaker at each end, a trip coil for each circuit-breaker, current transformers in the phases of the protected circuit at each end thereof, a combined summation transformer and relay device at each end comprising a magnetic core, a winding on the core, tapping points on the winding connected to the adjacent current transformers, an armature actuated when the flux in the core exceeds a predetermined value and normally open contacts closed when the armature is actuated to effect the energization of the trip coil of the adjacent circuit-breaker, means for supplying to each end of the pilot wire circuit a current having a direction corresponding to the direction of current flow in the protected circuit at the adjacent end, and at least one lock-out relay acting to render the operation of the armatures of the tripping relay devices ineffective when current is flowing in the same direction at both ends of the protected circuit.

10. In an electric protective arrangement for a multiphase alternating current circuit the combination of a pilot wire circuit extending between the ends of the protected circuit, a circuit-breaker at each end, a trip coil for each circuit-breaker, current transformers in the phases of the protected circuit at each end thereof, a combined summation transformer and tripping relay device at each end comprising a U-shaped magnetic core, a winding on the core, tapping points on the winding connected to the adjacent current transformers, the parts of the winding on the two limbs being so arranged that they are energized symmetrically from the current transformers in the several phases, an armature actuated when the flux in the core exceeds a predetermined value and normally open contacts closed when the armature is actuated to effect the energization of the trip coil of the adjacent circuit-breaker, means for supplying to each end of the pilot wire circuit a current having a direction corresponding to the direction of current flow in the protected circuit at the adjacent end, and at least one lock-out relay acting to render the operation of the armatures of the tripping relay devices ineffective when current is flowing in the same direction at both ends of the protected circuit.

11. An electric protective system for an alternating current circuit including in combination a circuit-breaker at each end of the protected section, a trip circuit for each circuit-breaker, a tripping relay device at each end controlling the trip circuit of the adjacent circuit-breaker and operative in accordance with the current flow conditions at the adjacent end of the protected circuit, current transformers at each end of the protected circuit, a saturable transformer at each end of the protected circuit having its primary winding energized from the adjacent current transformers, a pilot wire circuit so connecting the secondary windings of the saturable transformers at each end of the protected circuit that the currents supplied to the pilot wire circuit from the two saturable transformers are additive when the direction of current flow in the protected circuit is the same at both ends, a lock-out relay at each end connected in series with the pilot wire circuit and operated when the current flowing in the pilot wire circuit is greater than a predetermined value exceeding the saturation current supplied to that circuit from the secondary winding of one of the saturable transformers alone and normally closed contacts on each lock-out relay arranged in series in the trip circuit of the adjacent circuit-breaker so as to open a point in the trip circuit and prevent tripping of the circuit-breaker when the lock-out relay operates.

12. In an electric protective arrangement for a multiphase alternating current feeder the combination of a pilot wire circuit extending between the ends of the protected circuit, a circuit-breaker at each end, a trip coil for each circuit-breaker, a slow-acting auxiliary relay at each end controlling the trip coil of the adjacent circuit-breaker, an energizing circuit therefor, current transformers in the phases of the protected circuit at each end thereof, a combined summation transformer and relay at each end comprising a magnetic core, a winding on the core, tapping points on the winding connected to the adjacent current transformers, output terminals on the winding, an armature actuated when the flux in the core exceeds a predetermined value and normally open contacts closed when the armature is actuated to complete the energizing circuit of the adjacent auxiliary relay, a saturable transformer at each end having its primary winding connected to the output terminals of the combined summation transformer and tripping relay device and its secondary winding connected to the pilot wire circuit, a lock-out relay at each end connected in series in the pilot wire circuit and calibrated so that it operates when the current flowing in that circuit is greater than a predetermined value exceeding the saturation current supplied to the circuit by one saturable transformer alone and normally closed contacts on each lock-out relay arranged when the relay operates to open the energizing circuit of the adjacent auxiliary relay.

13. In an electric protective arrangement for a multiphase alternating current feeder the combination of a pilot wire circuit extending between the ends of the protected circuit, a circuit-breaker at each end, a trip coil for each circuit-breaker, a slow-acting auxiliary relay at each end controlling the trip coil of the adjacent circuit-breaker, an energizing circuit therefor, current transformers in the phases of the protected circuit at each end thereof, a combined summation transformer and tripping relay device at each end comprising a U-shaped magnetic core, a winding on the two limbs of the core, tapping points on the winding connected to the adjacent current transformers, the parts of the winding on the two limbs being so arranged that they are energized symmetrically from the current transformers in the several phases, output terminals on the winding, an armature actuated when the flux in the core exceeds a predetermined value and normally open contacts closed when the armature is actuated to complete the energizing circuit of the adjacent auxiliary relay, a saturable transformer at each end having its primary winding connected to the output terminals of the combined summation transformer and tripping relay device and its secondary winding connected to the pilot wire circuit, a lock-out relay at each end connected in series in the pilot wire circuit and calibrated so that it operates when the current flowing in that circuit is greater than a predetermined value exceeding the saturation current supplied to the circuit by one saturable transformer alone and normally closed contacts on each lock-out relay arranged when the relay operates to open the energizing circuit of the adjacent auxiliary relay.

14. In an electric protective arrangement for a multiphase alternating current feeder the combination of a pilot wire circuit extending between the ends of the protected circuit, a circuit-breaker at each end, a trip coil for each circuit-breaker, a slow-acting auxiliary relay at each end controlling the trip coil of the adjacent circuit-breaker an energizing circuit therefor, current transformers in the phases of the protected circuit at each end thereof, a combined summation transformer and relay at each end comprising a magnetic core, a winding on the core, tapping points on the winding connected to the adjacent current transformers, output terminals on the winding, an armature actuated when the flux in the core exceeds a predetermined value and normally open contacts closed when the armature is actuated to complete the energizing circuit of the adjacent auxiliary relay, a saturable transformer at each end having its primary winding connected to the output terminals of the combined summation transformer and tripping relay device and its secondary winding connected to the pilot wire circuit, a lock-out relay at each end connected in series in the pilot wire circuit and calibrated so that it operates when the current flowing in that circuit is greater than a predetermined value exceeding the saturation current supplied to the circuit by one saturable transformer alone, normally closed contacts on each lock-out relay arranged when the relay operates to open the energizing circuit of the adjacent auxiliary relay, and a slow-acting relay at each end controlling the trip coil of the adjacent circuit-breaker and arranged to operate a predetermined time after the armature of the combined summation transformer and relay has operated to effect the tripping of the circuit-breaker independently of the operation of the adjacent lock-out relay.

In testimony whereof we have signed our names to this specification.

REGINALD WILLIAM BILES.
ERIC WALTER MARBURY SCOTT.